(12) United States Patent
Wiemer et al.

(10) Patent No.: US 9,314,036 B2
(45) Date of Patent: Apr. 19, 2016

(54) CLIPPING TOOL ASSEMBLY WITH CRANK SHAFT

(71) Applicant: Poly-clip System GmbH & Co. KG, Hattersheim (DE)

(72) Inventors: Peter Wiemer, Meerbusch (DE); Klaus Töpfer, Büttelborn (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/390,055

(22) PCT Filed: Mar. 21, 2013

(86) PCT No.: PCT/EP2013/055888
§ 371 (c)(1),
(2) Date: Oct. 2, 2014

(87) PCT Pub. No.: WO2013/149840
PCT Pub. Date: Oct. 10, 2013

(65) Prior Publication Data
US 2015/0093980 A1    Apr. 2, 2015

(30) Foreign Application Priority Data
Apr. 4, 2012    (EP) .................................... 12002459

(51) Int. Cl.
*A22C 11/00* (2006.01)
*A22C 11/12* (2006.01)
*B65B 51/04* (2006.01)

(52) U.S. Cl.
CPC ............... *A22C 11/125* (2013.01); *B65B 51/04* (2013.01)

(58) Field of Classification Search
CPC .. A22C 11/00; A22C 11/10; A22C 2011/101; A22C 11/108; A22C 11/12; A22C 11/125
USPC ............................... 452/30–35, 37, 46–48, 51
See application file for complete search history.

(56) References Cited

U.S. PATENT DOCUMENTS

| | | | | |
|---|---|---|---|---|
| 5,405,288 A | * | 4/1995 | Stanley | A22C 11/125 29/243.56 |
| 5,755,022 A | * | 5/1998 | Whittlesey | A22C 11/127 29/243.56 |

(Continued)

FOREIGN PATENT DOCUMENTS

| | | |
|---|---|---|
| EP | 0000821 | 2/1979 |
| EP | 0919473 | 6/1999 |

(Continued)

OTHER PUBLICATIONS

International Search Report and the Written Opinion Dated Jun. 12, 2013 From the International Searching Authority Re. Application No. PCT/EP2013/055888.

*Primary Examiner* — Richard Price, Jr.
(74) *Attorney, Agent, or Firm* — Fitch, Even, Tabin & Flannery LLP

(57) ABSTRACT

The present invention relates to a clipping tool assembly for closing a closure clip in a clipping machine for forming sausages. The clipping tool assembly comprises a first and a second closing tool movable between a closed and an opened position; a drive means for moving the closing tools in a closing direction, the drive means including a crank shaft having a first and a second crank pin. The clipping tool assembly further comprises a first and a second tool arm having first and second ends, with the first and second closing tools being attached to the respective first end, the tool arms being coupled to the crank pins in the region of their second ends. A first and a second linear guide slot is provided in the region of the second end of the tool arms, in which the crank pins are slidable guided.

17 Claims, 9 Drawing Sheets

(56) References Cited

U.S. PATENT DOCUMENTS

| | | | |
|---|---|---|---|
| 6,484,474 B1 | 11/2002 | Knieriem | |
| 7,475,521 B2 * | 1/2009 | Topfer | A22C 11/125 242/566 |
| 7,654,889 B2 * | 2/2010 | Ebert | A22C 11/125 452/48 |
| 8,579,682 B2 * | 11/2013 | Ebert | A22C 11/125 452/48 |
| 8,657,654 B2 * | 2/2014 | Ebert | A22C 11/02 452/35 |

FOREIGN PATENT DOCUMENTS

| | | |
|---|---|---|
| EP | 1037803 | 9/2000 |
| EP | 2335486 | 6/2011 |
| WO | WO 2013/149840 | 10/2013 |

\* cited by examiner

CLIPPING TOOL ASSEMBLY WITH CRANK SHAFT

RELATED APPLICATIONS

This application is a National Phase of PCT Patent Application No. PCT/EP2013/055888 having International filing date of Mar. 21, 2013, which claims the benefit of priority of European Patent Application No. 12002459.1 filed on Apr. 4, 2012. The contents of the above applications are all incorporated by reference as if fully set forth herein in their entirety.

The present invention relates to a clipping tool assembly according to the preamble of independent claim 1.

In particular, the present invention relates to a clipping tool assembly for closing at least one closure means, like a closure clip, in a packaging machine, like a clipping machine, for closing tubular packaging casings for forming sausage-shaped products, like sausages. The clipping tool assembly comprises a first closing tool and a second closing tool, linearly and reversibly movable towards each other between a closed position and an opened position, for closing the at least one closure means, and a drive means for moving the first and the second closing tool towards each other in a closing direction. The present invention further relates to a clipping machine for producing sausage-shaped products, like sausages, by filing a flowable filling material into a tubular or bag-shaped packaging casing and closing said packaging casing by a closure means, like a closure clip, the clipping machine comprises the inventive clipping tool assembly.

In practice, it is known that, for example in the production of sausage-shaped products, like sausages, filling material is fed by a filling machine through a filling tube of a clipping machine into a tubular packaging casing which is stored on the filling tube and which is closed at its front end, i.e. the end pointing in the feeding direction of the filling material by a closure means, like a closure clip. The tubular packaging casing is pulled off from the filling tube while being filled by the feeding pressure. After a predetermined volume of filling material has been filled into said tubular packaging casing, a displacer arrangement with a first and a second displacer unit which can each be formed by a pair of reversibly moveable displacement elements, a plait-like portion of the tubular packaging casing is formed. The clipping machine then places and closes at least one closure clip at the plait-like portion forming the rear end of the sausage shaped product, i.e. the end pointing against the feeding direction by respective closing tools which are reversibly movable towards the plait-like portion.

For reversibly moving the first and the second closing tool between their opened and closed positions, various kinds of drive mechanisms are used. From DE patent 197 38 298, a clipping machine is known, wherein the first and the second closing tool, a punch and a die, are mounted to first ends of respective closing levers. Said closing levers are coupled by their second ends to a common pivot axis. For reversibly moving the closing tools between their opened and closed position, in order to place and close a closure clip on the filled and gathered tubular packaging casing, the closing levers are driven by a cam plate.

From DE patent 10 2007 012 777, a clipping machine and a method for controlling said clipping machine being different in their structure as to the arrangement and movement of the closing tools compared to the clipping machine described above, are known. Here, the closing tools, like a punch and a die, are commonly move from the same side towards the plait-like portion formed to a tubular casing, for applying a closure clip thereto. In one embodiment of said known clipping machine, the levers carrying the closing tools are moved linearly towards the plait-like portion, whereby one of said levers carrying the die, is guided in a groove. Said groove is formed in a manner to allow the closing tools to pivot away from and back to the plait-like portion, while being moved towards said plait-like portion of the tubular casing, in order to position the punch at one side of the plait-like portion, and fixedly position the die at the respective other side of the plait-like portion. Thereafter, the punch is moved towards the die for placing and closing a closure clip grabbed during said movement, at the plait-like portion.

When pivoting the closing tools towards the plait-like portion by pivot levers arranged opposite the plate-like portion of the tubular casing to be closed as it has been described above in conjunction with the first known clipping machine, the respective space within the housing of the clipping machine around the tubular casing is required for the necessary pivot movement of the levers. On the other hand, the known drive mechanism for commonly moving the closing tools to the plait-like portion from one side as discussed above in conjunction with the second known clipping machine is of a complex structure and requires a respective complex control. Moreover, it is common to both solutions that they need a lot of space for their mechanism. This is of disadvantage if only few space for the complete packaging or clipping machine, respectively, is available.

Thus, it is an object of the present invention to provide a clipping tool assembly for a clipping machine, which requires a reduced effort for controlling said clipping machine, and which is of a simplified construction. Moreover, the clipping tool assembly for a clipping machine shall allow a compact construction of the whole machine.

The above object is solved by the features of independent claim 1 attached. In particular, according to the present invention, there is provided a clipping tool assembly for closing at least one closure means, like a closure clip, in a packaging machine, like a clipping machine, for closing tubular packaging casings for forming sausage-shaped products, like sausages. The clipping tool assembly comprises a first closing tool and a second closing tool, linearly and reversibly movable towards each other between a closed position and an opened position, for closing the at least one closure means, and a drive means for moving the first and the second closing tool towards each other in a closing direction. The drive means include a crank shaft having a central axis and at least a first and a second crank pin. The clipping tool assembly further comprises a first tool arm having a first and a second end, with the first closing tool being attached to its first end, the first tool arm being coupled to the at least first crank pin in the region of its second end; and a second tool arm having a first and a second end, with the second closing tool being attached to its first end, the second tool arm being coupled to the at least second crank pin in the region of its second end. Furthermore, according to the present invention, a first linear guide slot is provided in the region of the second end of the first tool arm, and a second linear guide slot is provided in the region of the second end of the second tool arm, in which the at least first and second crank pins are slidable guided.

In this configuration, the drive means for the first and the second closing tool is of a simplified and compact construction including a marginal number of components whereby the effort for controlling said clipping tools is reduced. Additionally, the closure forces acting on a closure means as well as the respective counter forces are absorbed within the closure tool assembly. Thus, none of these forces are transmitted to frame elements supporting the clipping tool assembly. Accordingly, said frame elements may be of a simplified and/or lighter construction.

In a further advantageous embodiment of the clipping tool assembly the first guide slot is aligned to the closing direction in a first angle, and the second guide slot is aligned to the closing direction in a the second angle, the first and the second angle are different from the right angle and are supplementary angles. That means that the first and the second guide slot are not aligned parallel to each other, but deviate about the same angle from a direction vertical to the closing direction, about the same angle, but in the opposite direction. This orientation of the guide slots, on the one hand, causes an increase in the extreme values, maximum and minimum, of the sinusoidal moving path of the first and second closing tools, and on the other hand, a positive difference in phase for one of the closing tools and a negative difference in phase for the respective other closing tool, relative to the sinusoidal moving path of the crank pins. Due to this configuration, the time for the closing operation is extended, which effects a safe closing of the closure means.

The above mentioned deviations in the extreme values and differences in phase of the sinusoidal moving paths of the closing tools may be set by choosing respective angles for the guide slots. In a preferred embodiment, the first angle is in a range between 45° and 90°, preferably in a range between 70° and 80°. Accordingly, the second angle is in a range between 90° and 135°, preferably in a range between 100° and 110°. Reliable and proper results have been achieved by setting the first angle to 78° and the second angle to 102°, accordingly.

In order to enhance the results of the closing operation, an alignment angle is provided between the at least second crank pin and the at least first crank pin, which, in the rotation direction of the crank shaft, is in a range between 90° and 180°. Depending on the size of the alignment angle, the difference in phase of the moving path of one of the closing tools may be varied by maintaining the difference in phase of the moving path of the respective other closing tool. This additional difference in phase leads to a further optimization of the closing operation.

Depending on the size of the alignment angle, an optimal difference in phase may be set. Advantageously, the alignment angle is in a range between 110° and 170°, preferably in a range between 120° and 140°.

For a further optimization of the closing results, an adaption of one or both of the closing tools and/or one or both of the tool arms to the alignment angle may be executed. Thus, at least one dimension of the first and/or the second tool arm or the first and/or the second closing tool is adapted to balance a clearance between the first and second closing tool when in their closed position, caused by the alignment angle.

In a further advantageous embodiment of the closing tool assembly, the second ends of the first and the second tool arm are coupled to the at least first and second crank pins of the crank shaft by bearing means. Said bearing means include slide blocks rotatable attached to the at least first and second crank pins, and linearly slidable guided in the first and second guide slots. The bearing means generally reduce frictional forces. The slide blocks enable a save guidance of the crank pins in the guide slots.

According to a preferred configuration of the inventive clipping tool assembly, linear guide means are provided for linearly guiding the first tool arm relative to the second tool arm, for linearly moving the first and second closing tool between their opened position and their closed position.

In order to provide a save and simple construction, the linear guide means include at least a first and a second guide element, provided at the first and second tool arm. The linear guide means may be realized in various ways, like a dovetail guide or a rectangular guide.

By means of the closure tool assembly, together with the closure means, means for handling or identifying the sausage-shaped product, like a loop or a tag, may be attached thereto. In case that a tag has to be attached to the sausage-shaped product, a tag or label, respectively, handling device for positioning and holding a tag or label, respectively, to be attached by the closure means to the tubular packaging casing.

In order to secure the tag or label, respectively, in a correct and safe position, the handling device includes an approximately U-shaped shifting element capable of engaging a tag fed to the clipping assembly, and a drive for driving said shifting element.

The clipping tool assembly according to the present invention further comprises a pivot lever for reversibly pivoting the first and the second closing tool about the central axis of the crank shaft between a closing position and a retracted position. This pivot movement moves the closing tools towards the tubular packaging casing to be closed, particularly to the plait-like portion formed on said tubular packaging casing, for applying a closure means to said plait-like portion, and retracts the closing tools after the tubular packaging casing has been closed.

In a preferred embodiment, the pivot lever is rotatable mounted to the crank shaft, in order to align the pivot axis of the pivot lever to the central axis of the crank shaft.

Moreover, there is provided a clipping machine for producing sausage-shaped products, like sausages, by filing a flowable filling material into a tubular or bag-shaped packaging casing and closing said packaging casing by a closure means, like a closure clip. The clipping machine comprises a clipping tool assembly according to the present invention. The clipping machine provides the same advantages as described in conjunction with the inventive clipping tool assembly.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION OF THE INVENTION

Figure 1:
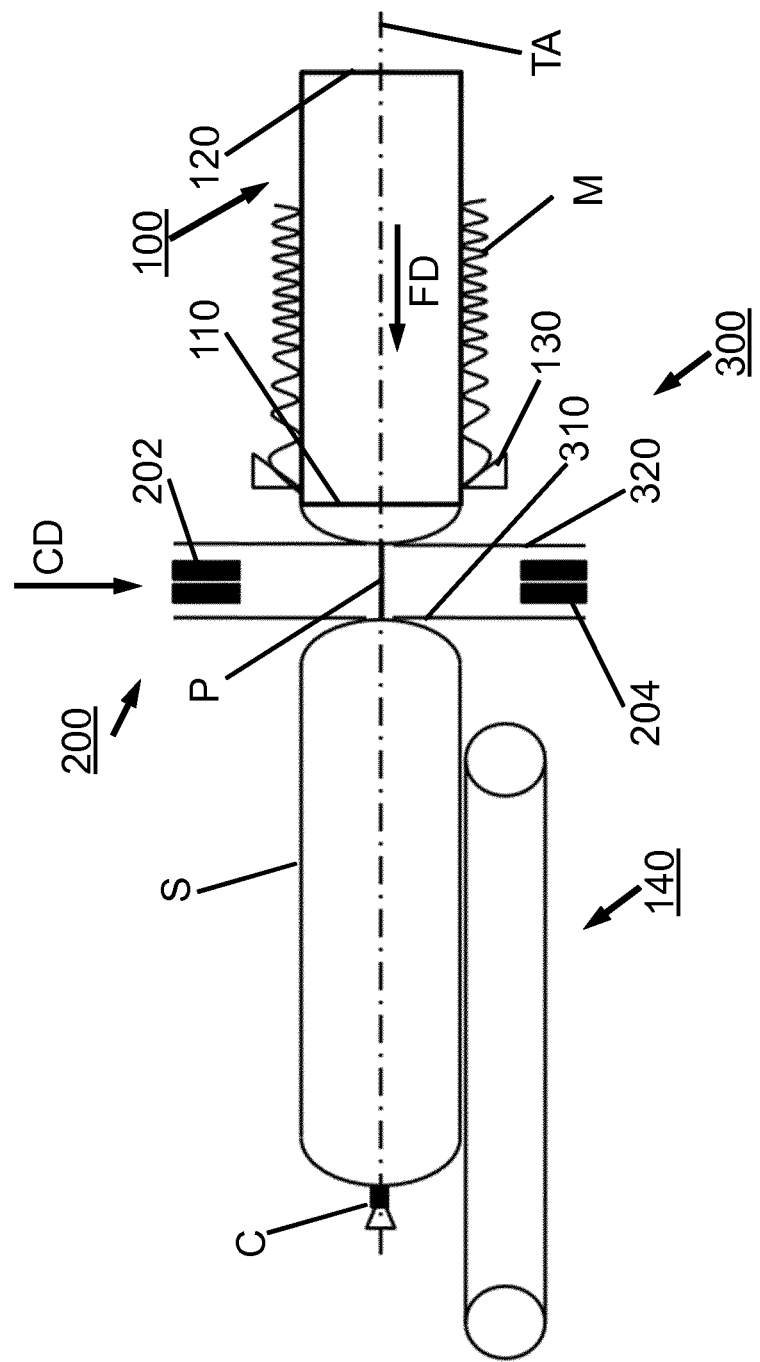
FIG. 1: is a schematic view to a clipping machine according to the present invention, wherein a tubular packaging casing is filled and gathered.

A clipping machine 1 for producing sausage-shaped products S according to the present invention and shown in FIG. 1, comprises as main components a at least approximately cylindrical filling tube 100 having a longitudinally extending central axis TA and being made of stainless steel, wherein a tubular packaging casing M made of a thin sheet material is stored on the filling tube 100, a clipping tool assembly 200 for closing the filled tubular packaging casing M by applying a closure means, like a closure clip C, to said plait-like portion P, and gathering means 300 for gathering the filled tubular packaging casing M and for forming a plait-like portion P thereto arranged downstream filling tube 100.

As it can be inferred from FIG. 1, horizontally arranged filling tube 100 has a left end 110 facing clipping tool assembly 200 and a right end 120 coupled to a filler arrangement (not shown in FIG. 1) including a pump for feeding filling material, like sausage meat through filling tube 100 in a feeding direction FD. A casing brake device 130 is arranged on filling tube 100 in vicinity of left end 110 of the filling tube 100 in order to control the movement of tubular packaging casing M when pulled-off from filling tube 100 by the filling pressure of the filling material.

Figure 2:
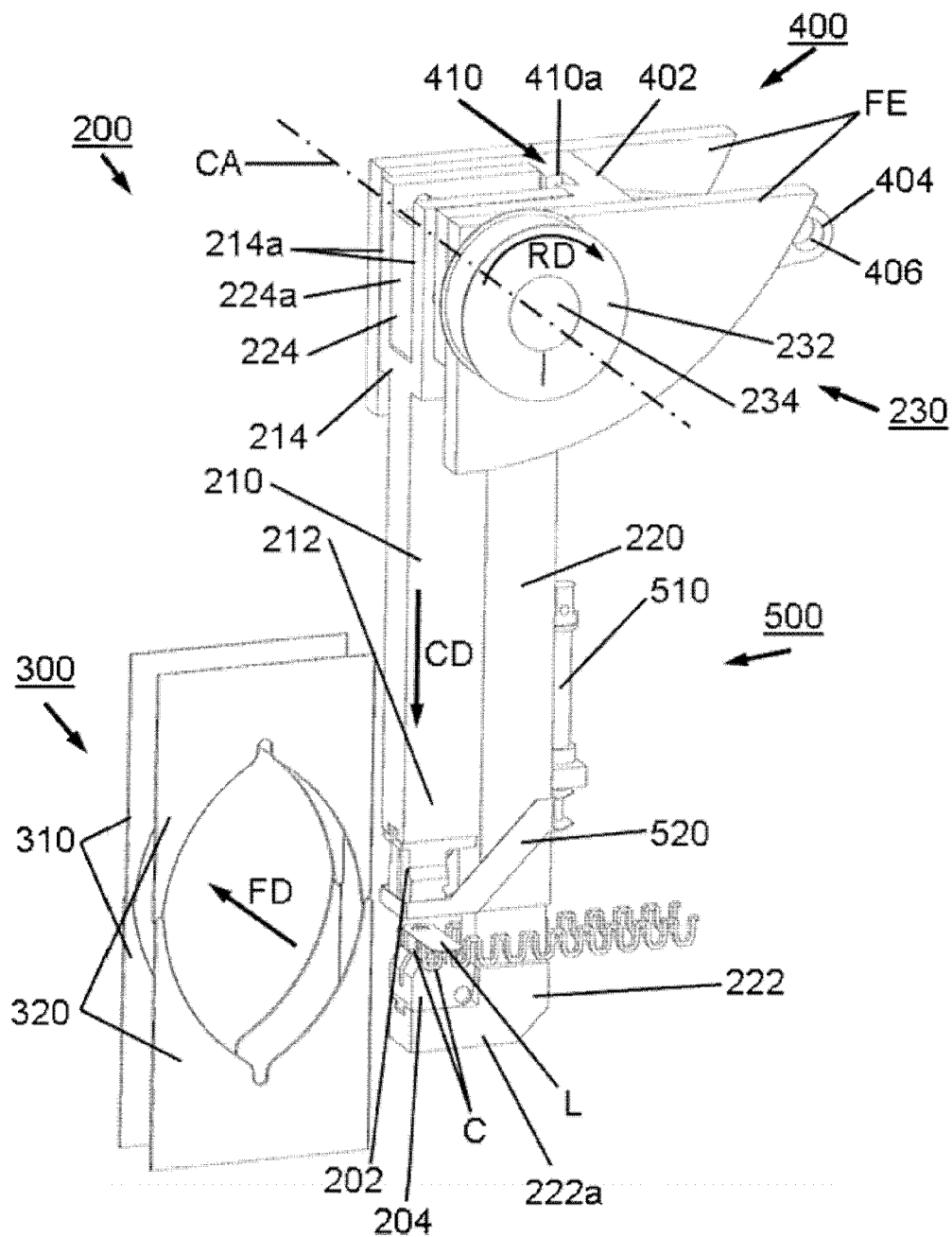
FIG. 2: is a schematic and perspective view to the clipping tool assembly according to the present invention, wherein the closing tools of the assembly are arranged in a retracted position.

Clipping tool assembly 200 is arranged immediately downstream left end 110 of filling tube 100 and comprises a first upper and a second lower pair of clipping tools 202, 204, wherein each pair of clipping tools 202, 204 includes two punches being arranged as the upper tools (referred to FIG. 2), and two dies being arranged as the lower tools (referred to FIG. 2). Both pairs of clipping tools 202, 204 being arranged one above the other, are reversibly movable towards plait-like portion P in a closing direction CD for applying and closing a closure clip C thereto.

Gathering means 300 includes a first displacer unit 310 and a second displacer unit 320, wherein first displacer unit 310 is positioned downstream second displacer unit 320. First and a second pair of clipping tools 202, 204 of clipping tool assembly 200 are positioned between first and second displacer units 310, 320.

Furthermore, for discharging a sausage-shaped product S just produced from the clipping machine 1, downstream clipping device 200, a transportation device e.g. in the form of a belt conveyor 140 is arranged, comprising a conveyor belt and guide rollers. The transportation direction of belt conveyor 140 coincides with feeding direction FD. The height of the upper conveyor belt section of belt conveyor 140 is aligned to the lower side of the sausage shaped product S to be produced and discharged from clipping machine 1.

FIG. 2 shows a schematic and perspective view to the clipping tool assembly 200 relative to the first and second displacer unit 310, 320 of gathering means 300. Two lines of clips C are positioned in clipping tool assembly 200, with their front most closure clip C provided in the lower clipping tools 204. Clipping tool assembly 200 is in the retracted position, which means, first and second pair of clipping tools 202, 204 are moved away from central axis TA of filling tube 100.

As it can be inferred from FIG. 2, clipping tool assembly 200 comprises a first tool arm 210 and a second tool arm 220. First and second tool arms 210, 220 have a substantially rectangular cross-section and are bar-shaped. Tool arms 210, 220, with their longitudinal extension, are aligned parallel to each other and extend in closing direction CD. First tool arm 210 has a first end 212 and a second end 214. At its first end 212, first tool arm 210 carries first upper pair of clipping tools 202. In the present embodiment, said first pair of clipping tools 202 is integrally formed, i.e. they are made of a single piece of material, in the following called the punches 202. Second tool arm 220 has a first end 222 and a second end 224. The first end 222 has a bent portion 222a which carries the second pair of clipping tools 204. Also the second pair of clipping tools 204 is integrally formed of a single piece of material. In the following, the second pair of clipping tools 204 will be called the dies 204. The first pair of clipping tools or punches 202 and the second pair of clipping tools or the dies 204 are aligned in closing direction CD and facing each other.

Clipping tool assembly 200 further comprises drive means 230 including a pulley 232 and a crank shaft 234, at which pulley 232 is rotatable and axially fixed mounted. Crank shaft 234 has a central axis CA which forms its axis of rotation and coincides with the axis of rotation of pulley 232. Further elements of drive means 230, like a drive motor or a belt for coupling the motor to pulley 232, for driving pulley 232, e.g. in a rotation direction RD, are not shown in the Figs.

Second ends 214, 224 of tool arms 210, 220 are coupled to respective crank pins of crank shaft 234, which will be described later in detail. Second end 214 of first tool arm 210 is fork-shaped and forms two parallel plate elements 214a, which are vertically aligned to central axis CA of crank shaft 234. Second end 224 of second tool arm 220 has a plate element 224a which is aligned parallel to plate elements 214a of first tool arm 210 and arranged there between.

Moreover, a pivot lever 400 is provided, having a first end 402 and a second end 404. First end 402 of pivot lever 400 is fork-shaped and encompasses second ends 214, 224 of first and second tool arm 210, 220. Moreover, it is rotatable mounted to the bearing pins of crank shaft 234. Fork-shaped first end 402 of pivot lever 400 has an approximately rectangular shaped surface which faces second ends 214, 224 of first and second tool arm 210, 220, and which form fits with the also approximately rectangular shaped ends 214, 224 of first and second tool arm 210, 220.

At the bottom surface of the approximately U-shaped first end 402 of pivot lever 400, which faces the rear side of first and second tool arm 210, 220, first linear guide means 410 are provided. First linear guide means 410 are aligned in closing direction CD and have a guide groove 410a incorporated in said bottom surface of the first end 402 of pivot lever 400, wherein the guide groove 410 is designed in the form of a dovetailed guide. A respective guide notch 410b (see FIG. 5) is arranged at the matching surface of second end 222 of second tool arm 220, and enables a linear movement of second tool arm 220 in closing direction CD relative to pivot lever 400.

Second end 404 of pivot lever 400 extends from crank shaft 234 perpendicular to central axis CA of crank shaft 234 and at least approximately perpendicular vertically to closing direction CD. At second end 404 of pivot lever 400, a mounting opening 406 is provided to couple pivot lever 400 to a pivot drive.

Clipping tool assembly 200 is mounted to and held by respective frame elements FE which are shown in FIG. 2, and in which crank shaft 234 is rotatable supported by its bearing pins.

In the region of first ends 212, 222 of tool arms 210, 220, a label guide mechanism 500 is provided, including a guide drive 510 in the form of a piston/cylinder drive, and a substantially U-shaped guide element 520. Guide drive 510, in the orientation of FIG. 2, is arranged at the rear side of second tool arm 220, which faces away from first tool arm 210 and gathering means 300, respectively. Guide element 520 surrounds first and second tool arms 210, 220, and is coupled to the piston of guide drive 510 to be shifted in closing direction CD. Moreover, as it can be seen in FIG. 2, a label or tag L, respectively, is placed with a mounting opening immediately above the front most clip C of the front most line of clips C, to be attached to the sausage-shaped product closed by said clip C.

Figure 3:
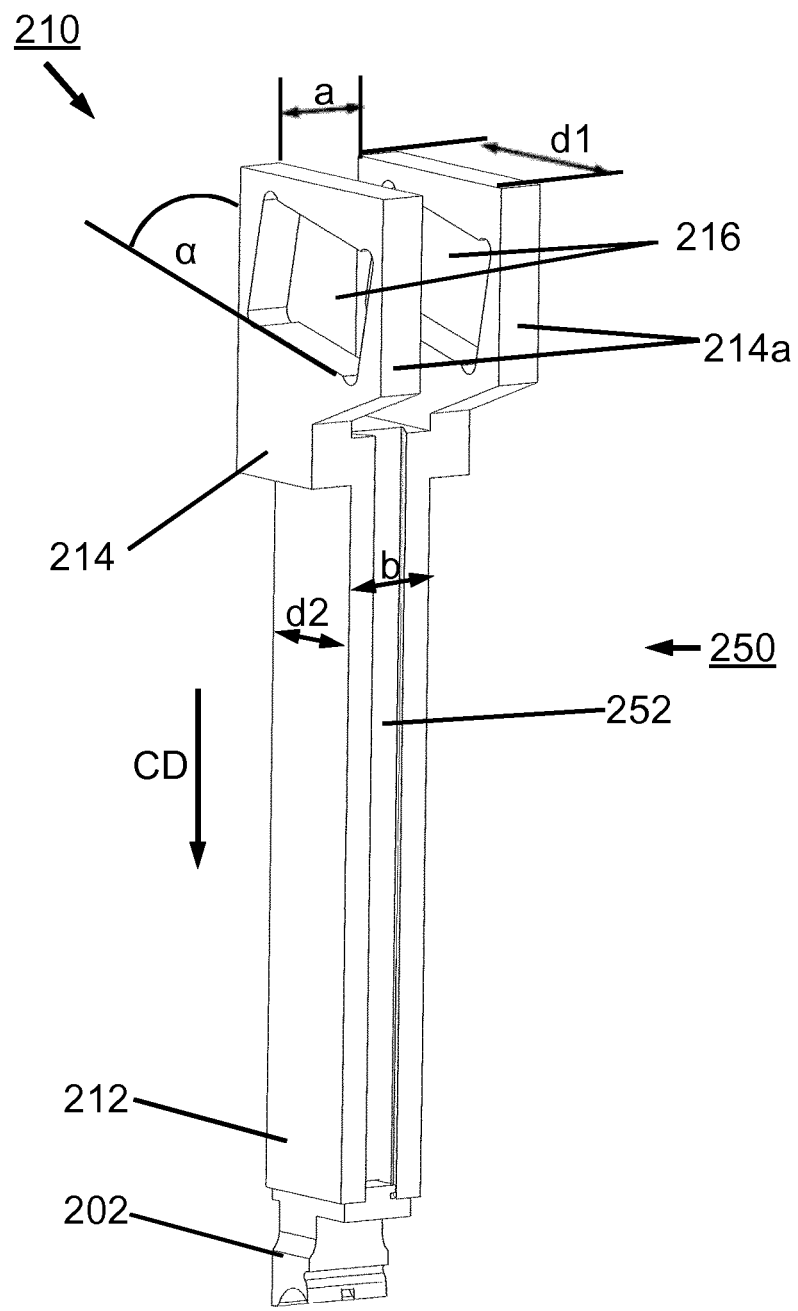
FIG. 3: is a schematic and perspective view to a first tool arm of the clipping tool assembly according to the present invention.

FIG. 3 is a schematic and perspective view to first tool arm 210 of clipping tool assembly 200. As already described in conjunction with FIG. 2, first tool arm 210 carries punches 202 at its first end 212. Punches 202 are fixed to first end 214 of first tool arm 210 by means of a guide extending perpendicularly to closing direction CD (see also FIG. 2), and is secured by a securing element, like a screw (not shown). Second end 214 of first tool arm 210 is fork-shaped and comprises two plate elements 214a arranged parallel to each other. The distance between plate elements 214 or width a of the gap corresponds to the width b of first tool arm 210. Depth d1 of plate elements 214a is larger than depth d2 of first tool arm 214.

Each of plate elements 214a comprises an approximately rectangular cutout which forms a first guide slot 216. The longitudinal extension of guide slot 216 is aligned to closing direction CD in a first angle $\alpha$, which is lower than 90°. That means, guide slots 216, according to FIG. 3, are sloping down from its left end to its right end. First angle $\alpha$, according to the embodiment of FIG. 3, is set to 78°.

As it further can be seen in FIG. 3, a groove 252 in the form of a dovetailed guide groove is arranged at the rear side of first tool arm 210, which faces second tool arm 220. Groove 252 is part of second linear guide means 250 for linearly guiding first and second tool arm 210, 220 along each other in closing direction CD. Second linear guide means 250 further comprise a guide notch 254 which is attached to second tool arm 220, and which will be described in detail below. Groove 252 extends in closing direction CD between first and second ends 212, 214 of first tool arm 210, and ends in the bottom portion of fork-shaped second end 214 and at first end 212, respectively.

Figure 4:
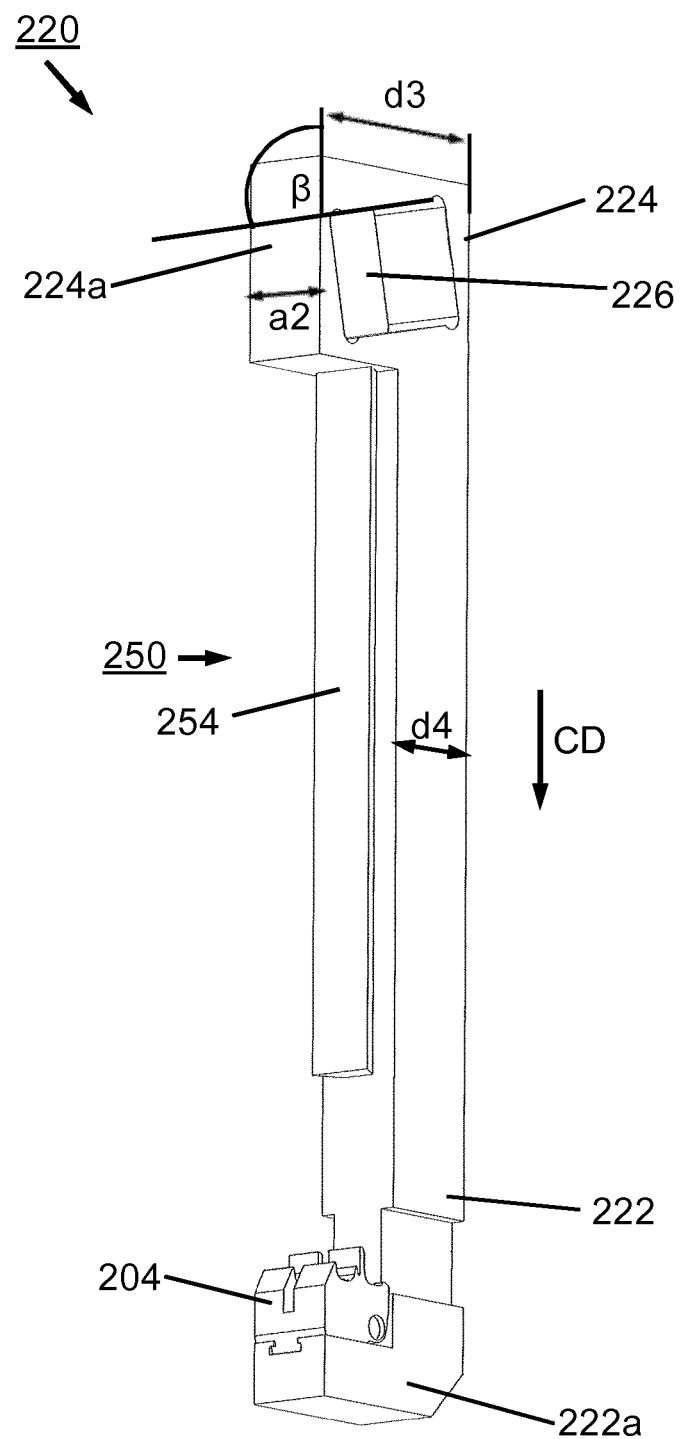
FIG. 4: is a schematic and perspective view to a second tool arm of the clipping tool assembly according to the present invention.

FIG. 4 shows a schematic and perspective view to second tool arm 220 of clipping tool assembly 200. As it can be seen in FIG. 4, first end 222 comprises bent portion 222a which extends at least approximately perpendicular from second tool arm 220, and which carries dies 204. Dies 204 are fixed to first end 222, or bent portion 222a, respectively, by a guide extending perpendicularly to closing direction CD, and are secured thereto by a securing element, like a screw (see also FIG. 2).

Second end 224 of second tool arm 220 comprises an approximately rectangular plate element 224a which extends to the front side of tool arm 220. Plate element 224a comprises an approximately rectangular cutout which forms a second guide slot 226. The longitudinal extension of guide slot 226 is aligned to closing direction CD in a second angle $\beta$, which is larger than 90°. That means, guide slot 226, according to FIG. 4, is sloping down from its right end to its left end, contrary to guide slots 216a of first tool arm 210. Second angle $\beta$ is set to 102°. Accordingly, first and second angles $\alpha$, $\beta$ are supplementary angles and their sum is 180°.

As further shown in FIG. 4, guide notch 254 is arranged at a surface of second tool arm 220 which faces the rear side of first tool arm 210. Guide notch 254 is part of second linear guide means 250 which also comprises a guide groove 252 (see FIG. 3). Guide notch 254 extends in closing direction CD between first and second ends 222, 224 of second tool arm 220 and ends immediately below plate element 214a at second end 224 and in the region of first end 222, in a short distance from bent portion 222a. Guide notch 254 has a cross-section which corresponds to the cross section of guide groove 252.

Second tool arm has a uniform width a2 which corresponds to the width a1 of the gap between plate elements 214a and the width b of first tool arm 210. Moreover, depth d3 of plate element 224a of second tool arm 220 corresponds to depth d1 of plate elements 214a of first tool arm 210.

Figure 5:
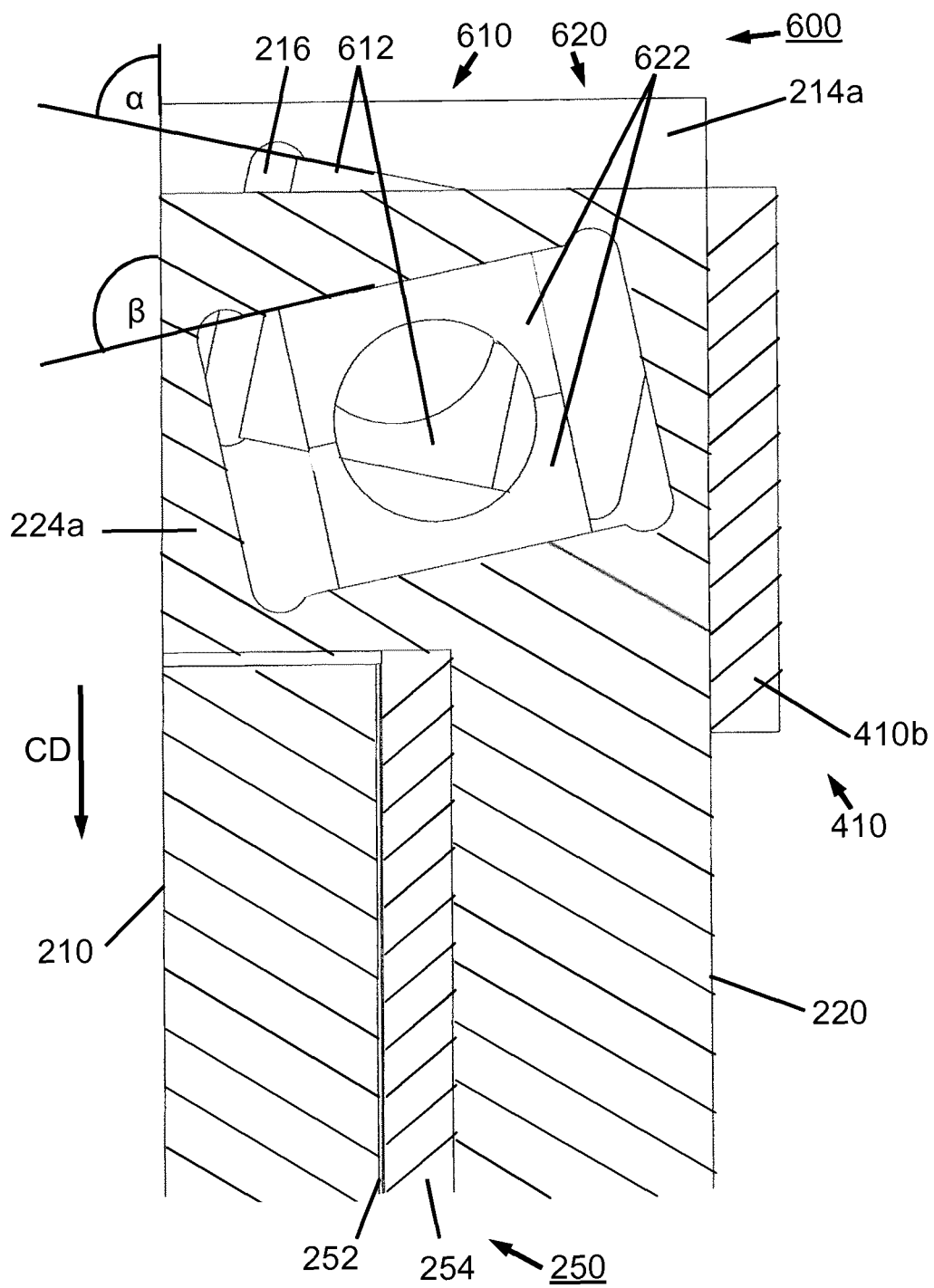
FIG. 5: is a partial cross-sectional and enlarged view to the second ends of the first and second tool arms.

FIG. 5 is a partial cross-sectional view to second ends 214, 224 of first and second tool arms 210, 220, in a center plane through first and second tool arms 210, 220 and vertically to central axis CA of crank shaft 234.

As it can be seen in FIG. 5, guide notch 254 of second linear guide means 250 engages guide groove 252 to enable a guided linear reversible movement between first and second tool arms 210, 220 in closing direction CD. Moreover, at the rear side of second tool arm 220, facing away from first tool arm 210, guide notch 410b of first linear guide means 410 is arranged and aligned in closing direction CD. Guide notch 410b extends at least approximately over the entire vertical height of plate element 224a of second tool arm 220. First and second guide slots 216, 226 are aligned to closing direction CD in first and second angles $\alpha$, $\beta$, as disclosed in conjunction with FIGS. 3 and 4.

Furthermore, as shown in FIG. 5, bearing means 600 in the form of first slide blocks 610 and second slide blocks 620, are positioned in guide slots 216, 226 of first and second tool arms 210, 220. First and second slide blocks 610, 620 are of identical design. Thus, in the following, only second slide block 620 will be explained in detail. Slide block 620 is of a substantially cubical shape with a horizontally aligned cylindrical breakout. The vertical height of slide block 620 corresponds to the vertical height of guide slot 226 and enables a sliding movement of slide block 620 in guide slot 226. Slide block 620 extends at least approximately over the entire width a2 of plate element 224a. The cylindrical breakout is aligned to central axis CA of crank shaft 234, and has a diameter which corresponds to the respective crank pin of crank shaft 234. Second slide block 620 is divided into two identical block portions 622, in a plane parallel to the upper surface of slide block 620 and centrally through the cylindrical cutout. Accordingly, first slide blocks 610, one is positioned in each of the cutouts 216 of plate portions 214a, are also formed of a substantially cubical shape with a horizontally aligned cylindrical breakout, and are divided into two identical block portions 612.

Figure 6:
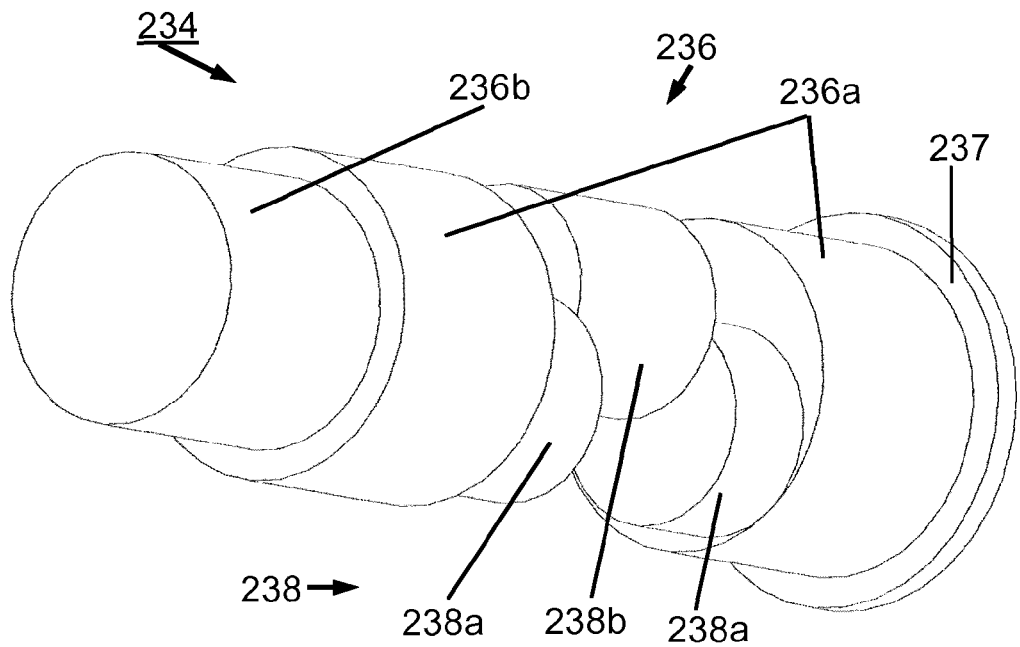
FIG. 6: is a schematic and perspective view to a crank shaft of the clipping tool assembly according to the present invention.

FIG. 6 is a schematic and perspective view to crank shaft 234 of clipping tool assembly 200. Crank shaft 234 comprises bearing pins 236 which are arranged at its left and right ends and are also designated with 236a, 236b. Bearing pins 236 are coaxially aligned with central axis CA. Between two bearing pins 236a, crank pins 238 including first and second crank pins 238a, 238b, are positioned. A bearing pin 236b is arranged at the left end of the left bearing pin 236a, at which pulley 232 is mounted for driving crank shaft 234 in rotation direction RD. The diameter of bearing pins 236a is identical, but some larger than the diameter of bearing pin 236b. The diameter of crank pins 238 is smaller than the diameter of bearing pin 236b. First crank pins 238a of crank pins 238 are positioned at the side surfaces of bearing pins 236a, which facing each other. Between first crank pins 238a, second crank pin 238b is positioned. First and second crank pins 238a, 238b are arranged eccentrically to central axis CA. A collar 237 surrounds the right end of the right bearing pin 236a.

Figure 7:
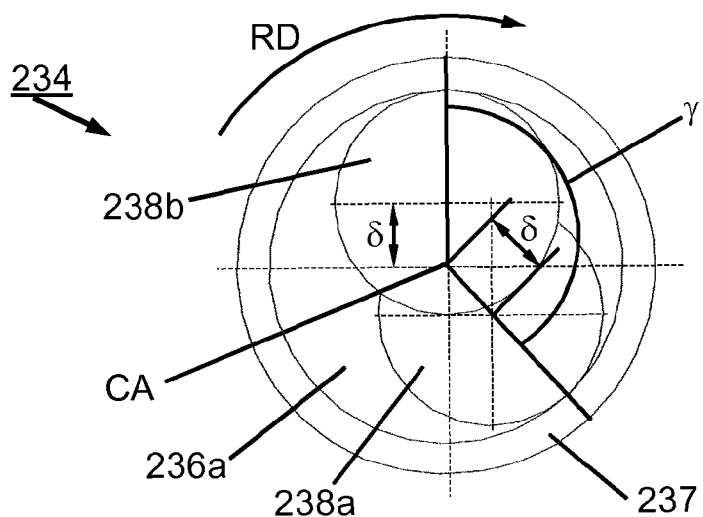
FIG. 7: is a cross sectional view to the crank shaft according to FIG. 6.

FIG. 7 shows a cross sectional view to crank shaft 234 in a plane perpendicular to central axis CA of crank shaft 234, seen from the left side in FIG. 6.

Second crank pin 238b is positioned vertically above central axis CA with an eccentricity 6 between its own central axis and central axis CA of crank shaft 234. First crank pin 238a is arranged with the same eccentricity 6 like second crank pin 238b with an alignment angle γ relative to second crank pin 238b in rotation direction RD. As it can be seen in FIG. 7, alignment angle γ is selected in a range between 90° and 180°. In the present embodiment, alignment angle γ is set to 135°.

Figure 8:
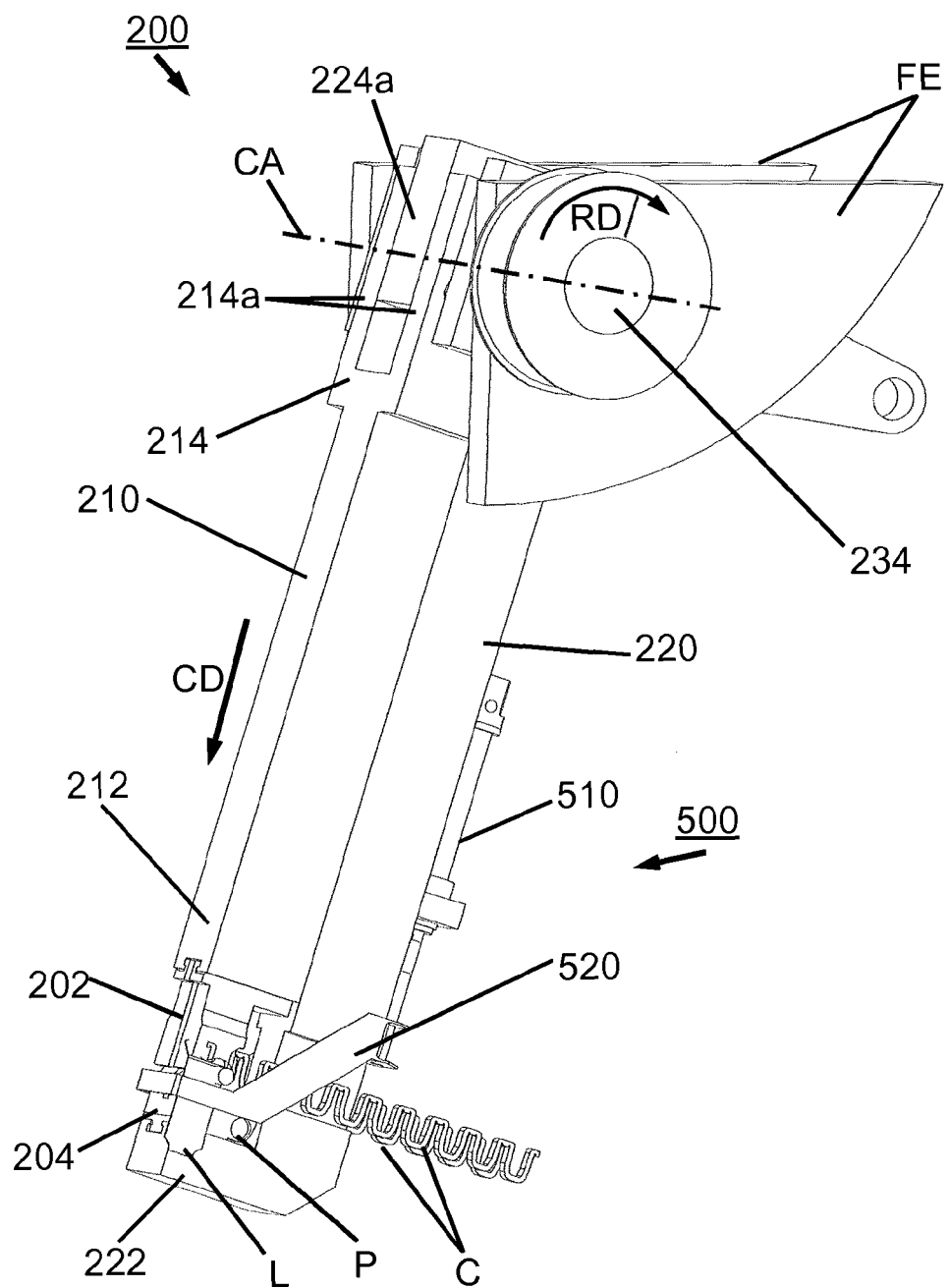
FIG. 8: is a schematic and perspective view to the clipping tool assembly according to the present invention, wherein the closing tools of the assembly are arranged in the closing position.

FIG. 8 shows a schematic and perspective view to clipping tool assembly 200 in the closing position. Clipping tool assembly 200 is rotatable supported by frame elements FE and, when compared with the retracted position as shown in FIG. 2, clockwise pivoted about central axis CA of crank shaft 234. In this position, first and second closing tools, punches 202 and dies 204, are positioned immediately above and below plait-like portion P formed to tubular packaging casing M for closing applying and closing a closure clip C thereto.

As it further can be seen in FIG. 8, guide mechanism 500 has been actuated, whereby the piston guide drive 510 together with U-shaped guide element 520 has been shifted towards the first ends 212, 222 of first and second tool arms 210, 220. The portion of label L or the free end projecting in a direction contrary to feeding direction FD is bent downwardly by guide element 520.

Figure 9:
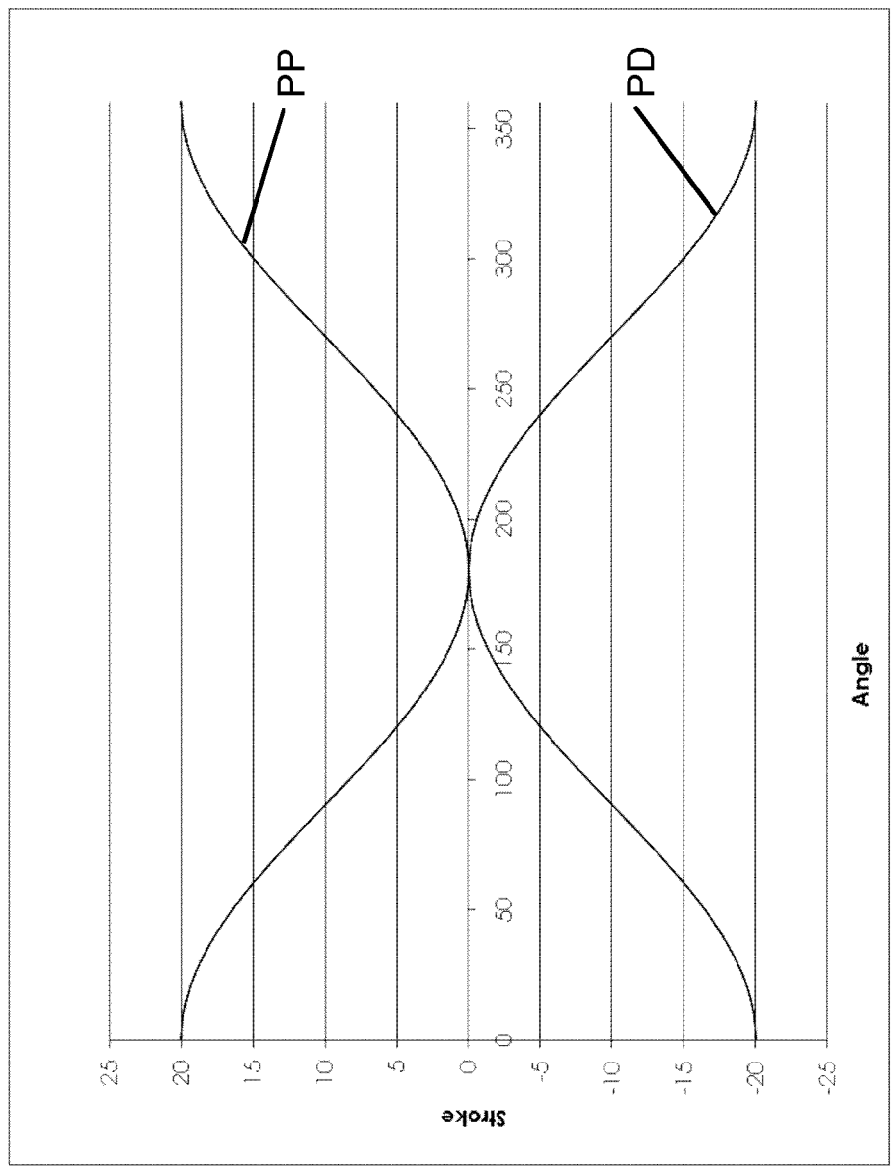
FIG. 9: is an exemplarily diagram of known moving paths of two closing tools.

FIG. 9 is an exemplarily explaining diagram of known moving paths PD, PP of two closing tools coupled to two crank pins which are arranged oppositely to each other with an alignment angle γ of 180°, and with tool arms of the same length, in the following called symmetric. Moreover, when using guide slots as proposed in the present invention, the guide slots have to be aligned to the closing direction in an angle of exactly 90°. The moving paths PD, PP are of a sinusoidal shape, and are displayed in an angular range from 0° to 360° about one revolution of the crank shaft. The zero line characterizes the maximum value of the displacement of the die(s) and the minimum value of the displacement of the punches. The moving path PD of the die(s) starts at an angle of 0° at a minimum value of −20 mm. After a revolution about an angle of 180°, the die(s) reach their maximum displacement value 0. By further rotating the crank shaft, the die(s) are moved to their minimum displacement reached at a rotation angle of 360°. The moving path PP of the punch(es) starts at an angle of 0° at its maximum displacement value of 20 mm. At this angle, punch(es) and die(s) reach their largest offset to each other. At a rotation angle of 180°, the punch(es) reach their minimum displacement value of 0 mm. When further rotating the crank shaft, the punch(es) are moved back to its maximum displacement value of 20 mm, reached at an angle of 360°.

As it can be seen in FIG. 9, the moving path PD of the die(s) and the moving path PP of the punch(es) touch each other at an angle of 180°. At this angle, also the closing tools are in closed vicinity, which is called the closing position. In the closing position, a closure clip C positioned in the die, is completely closed by the punch.

Figure 10:
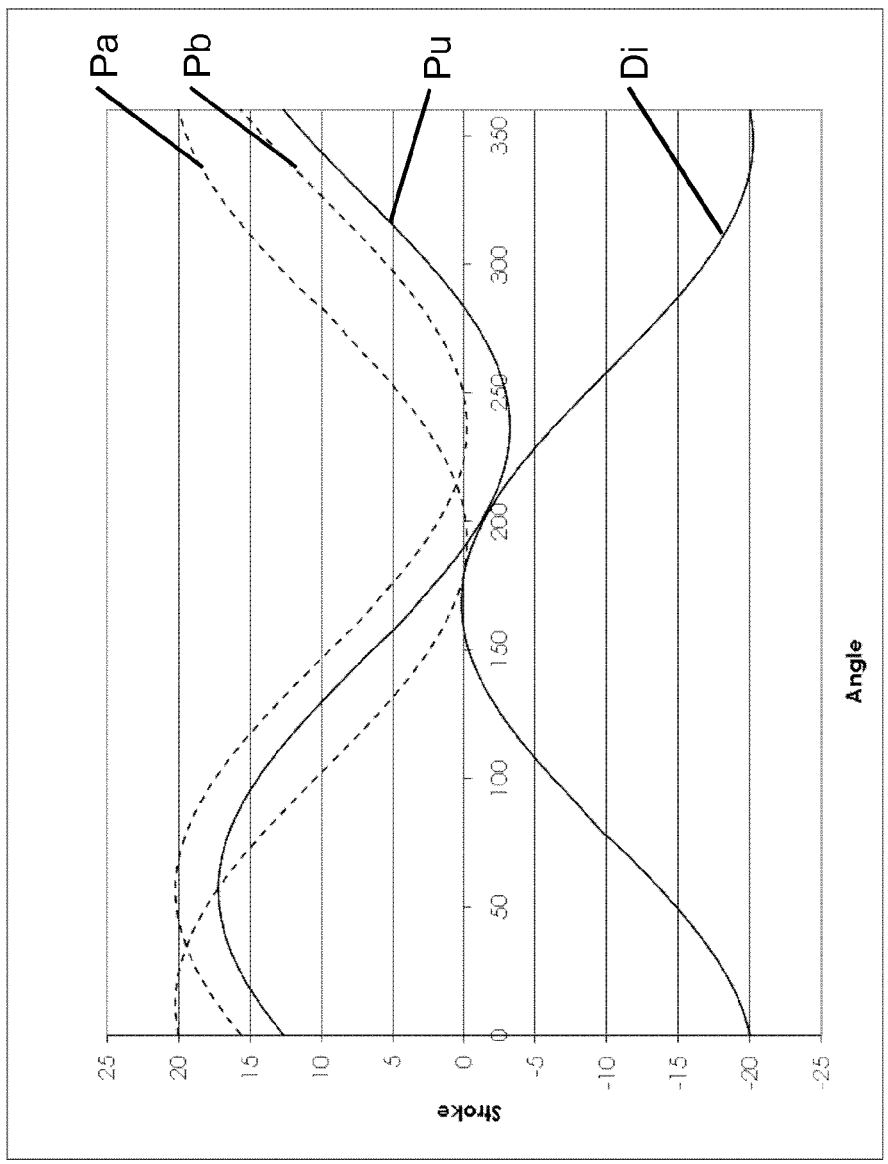
FIG. 10: is a diagram of the moving paths of the closing tools according to the present invention.

FIG. 10 shows an exemplarily explaining diagram of the moving paths Pu, Di of the first and second closing tools, punch(es) 202 and die(s) 204. As explained above, first and second guide slots 216, 226 are aligned to the closing direction CD in an angle different from 90°, in particular, the angle α of first guide slot 216 is smaller than 90°, the angle β of second guide slot 226 is larger than 90° and angles α and β are supplementary angles.

Due to that fact, moving path Di of die(s) 204 shows a difference in phase relative to moving path PD of FIG. 9. Moving path Di, in relation to moving path PD has been shifted to the left. Accordingly, moving path Di reaches his maximum displacement value at an angle smaller than 180°, in the present example at an angle of approximately 170°. Accordingly, the minimum displacement value is reached at an angle of approximately 350°. That means, the graph identifying the moving path Di has been shifted about an angle of approximately 10° to the left relative to moving path PD of FIG. 9. Furthermore, also the extreme values, the maximum displacement value and the minimum displacement values have been changed. The maximum value has been raised to a value larger than 0, presently approximately to 0.3 mm, and the minimum value has been changed about the same difference to approximately 20.3 mm.

In the same manner, the moving path Pu of punch(es) 202 has been changed. Due to the fact that angle α of first guide slot 216 is a supplementary angle to angle β of second guide slot 226, the moving path of punch(es) 202 has been shifted to the right relative to moving path PP of FIG. 9. Since the difference in the alignment angles to the right angle is equal, also the phase shift and the changes in the maximum and minimum displacement values are the same as to moving path D (see graph Pa in FIG. 10). An additional difference in phase occurs by changing alignment angle γ from 180° (as shown in FIG. 9) to a smaller angle as explained in conjunction with FIG. 7 (see graph Pb in FIG. 10). In order to balance the gap between graphs Di and Pb in the region around an angle of 200°, which indicates that the closing tools 202, 204 have a respective gap when in the closing position, the length of first and second tool arm 210, 220 and or the respective dimension of punch(es) 202 and die(s) 204 has to be adapted to allow the moving paths Pu, Di to contact each other, as shown in FIG. 10 at an angle of approximately 210°. The additional changes in the maximum and minimum displacement values, additional to the changes occurred by angles α, β of guide slots 216, 226, correspond to the changes in the respective dimensions of the first and second tool arm 210, 220 and/or first and second closure tools 202, 204.

The operation of the clipping tool assembly according to the present invention is as follows:

For producing sausage-shaped products S, filling material is fed through filling tube 100 into tubular packaging casing M which is closed at its front end by a closure clip C. After a predetermined portion of filling material has been fed into tubular packaging casing M, gathering means 300, in particular, first and second displacer units 310, 320 form a plait-like portion P to the tubular packaging casing M. Thereafter, two closure clips C are attached to the plait-like portion P, a first closure clip C in order to close the just filled section of the tubular casing packaging M, and the second closure clip C in order to close the front end of the remaining tubular packaging casing M.

During filling of the flowable filling material into tubular packaging casing M, clipping tool assembly 200 is in the retracted position as shown in FIG. 2. First and second closing tools 202, 204 are in their opened position, i.e. they are in their maximum distance from central axis TA of filling tube 100.

After a predetermined portion of filling material has been fed into tubular casing M, and first and second displacer units 310, 320 have formed a plait-like portion P to the tubular packaging casing M, first and second closing tools 202, 204 are moved to plait-like portion in order to apply two closure clips C thereto, by driving crank shaft 234 in rotation direction RD.

The rotation angle of crank shaft 234 in the situation shown in FIG. 2 is 0° as it can be seen in the diagram of FIG. 10 characterizing the moving paths Pu and Di and the position of first and second closing tools 202, 204 at a respective rotation angle of crank shaft 234. At an angle of 0° of crank shaft 234, punches 202 have not yet reached their maximum distance from dies 204 or the closing position, respectively, but are on their moving path away from said closing position, shown in FIG. 8. At the same time, when starting at the rotation angle of 0°, dies 202 have already reached their maximum distance from the closing position and moves upwardly towards the closing position.

While rotating crank shaft 234 from a rotation angle of 0° about one complete revolution up to 360°, punches 202 are moved to their maximum, at approximately 60° and are then moved back towards the closing position. Dies 204, at the same time, move towards the closing position and reach their maximum displacement value, which is larger than 0 mm, at an angle of approximately 170° and, in the further rotation of crank shaft 234, dies 204 are moved towards their maximum distance from the closing position. At an angle of approximately 200°, moving paths Pu, Di of punches 202 and dies 204 contact each other, character-izing the closing position, in which closure clips C applied to plait-like portion P are completely closed. Immediately before reaching the closing position, dies 202 move downwardly away from punches 202. Dies 202 have even now passed the maximum of graph Di, in which the speed of dies 204 is zero, and starts their downward movement at a low acceleration rate. In this phase, punches 202 also move downwardly towards their minimum displacement value, at a higher speed than dies 204. Thus, punches 202 can catch dies 204 before reaching their minimum displacement value followed by the upward movement of punches 202, and before dies 204 are out of range of punches 202. After passing the closing position, the speed of punches reduces to zero when reaching the minimum displacement value at an angle of approximately 230°, and the speed of dies 202 raises, bringing punches 202 and dies 204 out of contact.

As it can be seen in FIG. 10, dies 204, in which closure clips C are placed when moving towards plait-like portion P, said closure clips C have completely positioned around plait-like portion P before punches 202 act on closure clips C, due to the difference in phase between punches 202 and dies 204 causing a distance between punches 202 and dies 204 when dies 204 have reached their closest position at the plat-like portion P, at an angle of approximately 170°. In the further movement of punches 202 and dies 204, the distance between punches and dies 202, 204 becomes smaller and punches 202 start crimping closure clip C. In the closing position, at an angle of approximately 200°, closure clips C are completely crimped or closed around plait-like portion P and punches 202 and dies 204 depart from each other, releasing the closed clip C.

As mentioned above, due to the differences in phase of the moving paths Pu, Di of the closing tools 202, 204, and an adaption of at least one dimension of the closing tools 202, 204 to balance a gap there between, closure clip(s) C can be applied to plait-like portion P before punch(es) 202 deforms closure clip(s) C. Moreover, the closure procedure may be optimized, by lengthening the closure time or deformation time of closure clip C, without lengthening the whole closure process.

As also mentioned above, closure tools 202, 204 together with tool arms 210, 220 are pivoted between a retracted position as shown in FIG. 2 and a closing position as shown in FIG. 8. It has to be understood that the pivot movement of clipping tool assembly 200 has to be adjusted to the filling and gathering process. That means, during the filling and gathering process, clipping tool assembly 200 is in the retracted position. After gathering means 300 has formed a plait-like portion P to the filled tubular packaging casing M, clipping tool assembly 200 is pivoted into the closing position and the closing process as described above is executed. Thereafter, clipping tool assembly 200 is pivoted back into the retracted position.

It has also to be understood that, for optimizing the closing procedure, the pivot movement of clipping tool assembly 200 may be started before the gathering operation, in particular forming plait-like portion P, has been finished.

The first and second linear guide means, provided at pivot lever 400 and first and second tool arm 210, 220, according to the embodiment described in FIGS. 2 to 8, are dovetailed guides. Naturally, any other suitable guide means may be used, like rectangular or circular guides.

The differences in phase of the moving paths of closing tools 202, 204 as well as the maximum and minimum displacement values depend on the angles of guide slots 216, 226. In the present embodiment of clipping tool assembly 200 according to FIGS. 2 to 10, angles of 78° and 102° have been set. Naturally, other values than these may be chosen. But it has to be noted that the angles are supplementary angles. Moreover, at angles smaller than 45° for the first angle and larger than 135°, respectively, the function of the crank drive may be affected due to raising frictional forces between crank pin 238 or bearing means 600 and guide slots 216, 226.

Also, the adjustment angle between crank pins 238 may be different from that shown in the present embodiment. It has to be noted that the smaller the adjustment angle the larger is the gap between the moving paths of closing tool 202, 204. Thus, also the adaption of closing tools 202, 204 and/or tool arms 210, 220 has to be larger, causing a larger asymmetry in closing tools 202, 204 and/or tool arms 210, 220. Moreover, in case of a very small adjustment angle, and a to large asymmetry, respectively, applying and closing of clip(s) C at plait-like portion P is not possible anymore, since clip(s) C has already left plait-like portion P before being closed.

The shape of second ends 214, 224 of tool arms 210, 220 as one being fork-shaped and the other being encompassing by said fork-shaped end, require a specifically formed crank shaft having two crank pins 238 for the fork-shaped end of the respective tool arm 210, 220. Naturally, any other suitable shape of second ends 214, 224 is possible, like straight or angled ends, arranged laterally or two fork-shaped ends encompassing an element of a pivot lever 400.

Furthermore, also the explained arrangement of the first and second tool arm 210, 220 behind each other in the pivot direction may be altered. First and second tool arm 210, 220 may be arranged laterally in the feeding direction FD. First ends 212, 222 of the tool arms 210, 220, carrying the closing tools, have to be adapted to this arrangement.

The invention claimed is:

1. A clipping tool assembly for closing at least one closure means, like a closure clip, in a packaging machine, like a clipping machine, for closing tubular packaging casings for forming sausage-shaped products, like sausages, comprising:

a first closing tool and a second closing tool, linearly and reversibly movable towards each other between a closed position and an opened position, for closing the at least one closure means;

a drive means for moving the first and the second closing tool towards each other in a closing direction, the drive means including a crank shaft having a central axis and at least a first and a second crank pin; and a first tool arm having a first and a second end, with the first closing tool being attached to its first end, the first tool arm being coupled to the at least first crank pin in the region of its second end; and a second tool arm having a first and a second end, with the second closing tool being attached to its first end, the second tool arm being coupled to the at least second crank pin in the region of its second end;

wherein a first linear guide slot is provided in the region of the second end of the first tool arm, and a second linear guide slot is provided in the region of the second end of the second tool arm, in which the at least first and second crank pins are slidable guided.

2. The clipping tool assembly according to claim 1, wherein the first guide slot is aligned to the closing direction in a first angle, and wherein the second guide slot is aligned to the closing direction in a second angle, the first and the second angle are different from the right angle and are supplementary angles.

3. The clipping tool assembly according to claim 2, wherein the first angle is in a range between 45° and 90°, preferably in a range between 70° and 80°.

4. The clipping tool assembly according to claim 1, wherein an alignment angle is provided between the at least second crank pin and the at least first crank pin, which, in the rotation direction of the crank shaft, is in a range between 90° and 180°.

5. The clipping tool assembly according to claim 4, wherein the alignment angle is in one member of the group of ranges consisting of between 110° and 170°, and between 120° and 140°.

6. The clipping tool assembly according to claim 4, wherein at least one dimension of the first and/or the second tool arm or the first and/or the second closing tool is adapted to balance a clearance between the first and second closing tool when in their closed position, caused by the alignment angle.

7. The assembly according to claim 6, wherein the second ends of the first and the second tool arm are coupled to the at least first and second crank pins of the crank shaft by bearings.

8. The assembly according to claim 7, wherein the bearings include slide blocks rotatable attached to the at least first and second crank pins and linearly slidable guided in the first and second guide slots.

9. The assembly according to claim 1, wherein the second ends of the first and the second tool arm are coupled to the at least first and second crank pins of the crank shaft by bearings.

10. The assembly according to claim 9, wherein the bearings include slide blocks rotatable attached to the at least first and second crank pins, and linearly slidable guided in the first and second guide slots.

11. The assembly according to claim 1, wherein linear guide means are provided for linearly guiding the first tool arm relative to the second tool arm, for linearly moving the first and the second closing tool between their opened position and their closed position.

12. The assembly according to claim 11, wherein the linear guide means include at least a first and a second guide element, provided at the first and second tool arm.

13. The assembly according to claim 1, further comprising a label handling device for positioning and holding a label to be attached by the closure means to the tubular packaging casing.

14. The assembly according claim 13, wherein the handling device includes an approximately U-shaped shifting element capable of engaging a label fed to the clipping assembly, and a drive for driving said shifting element.

15. The assembly according to claim 1, further comprising a pivot lever for reversibly pivoting the first and the second closing tools about the central axis of the crank shaft between a closing position and a retracted position.

16. The assembly according to claim 15, wherein the pivot lever is rotatable mounted to the crank shaft.

17. A clipping machine for producing sausage-shaped products, like sausages, by filling a flowable filling material into a tubular or bag-shaped packaging casing (M) and closing said packaging casing by a closure means, the clipping machine comprises a clipping tool assembly according to claim 1.

* * * * *